US011726047B2

(12) United States Patent
Ohodnicki, Jr. et al.

(10) Patent No.: US 11,726,047 B2
(45) Date of Patent: Aug. 15, 2023

(54) DISTRIBUTED FIBER-OPTIC SENSOR NETWORK FOR SENSING THE CORROSION ONSET AND QUANTIFICATION

(71) Applicant: United States Department of Energy, Washington, DC (US)

(72) Inventors: Paul R Ohodnicki, Jr., Allison Park, PA (US); Ping Lu, Library, PA (US); Ruishu Wright, Pittsburgh, PA (US); Jagannath Devkota, Pittsburgh, PA (US)

(73) Assignee: United States Department of Energy, Washginton, DC (US)

( * ) Notice: Subject to any disclaimer, the term of this patent is extended or adjusted under 35 U.S.C. 154(b) by 0 days.

(21) Appl. No.: 16/149,774

(22) Filed: Oct. 2, 2018

(65) Prior Publication Data

US 2022/0276179 A1   Sep. 1, 2022

Related U.S. Application Data

(60) Provisional application No. 62/567,223, filed on Oct. 2, 2017.

(51) Int. Cl.
| | |
|---|---|
| *G01N 21/954* | (2006.01) |
| *H04B 10/071* | (2013.01) |
| *G01H 9/00* | (2006.01) |
| *F17D 5/00* | (2006.01) |

(52) U.S. Cl.
CPC ........... *G01N 21/954* (2013.01); *F17D 5/005* (2013.01); *G01H 9/004* (2013.01); *H04B 10/071* (2013.01); *G01N 2021/9546* (2013.01); *G01N 2201/0886* (2013.01)

(58) Field of Classification Search
CPC ................. G01N 21/954; G01N 2021/9546
See application file for complete search history.

(56) References Cited

U.S. PATENT DOCUMENTS

| | | | |
|---|---|---|---|
| 10,209,060 B1 * | 2/2019 | Nguyen | G01D 5/35316 |
| 2003/0094281 A1 * | 5/2003 | Tubel | E21B 47/00 |
| | | | 166/250.03 |

OTHER PUBLICATIONS

Xu Y, Lu P, Chen L, Bao X. Recent Developments in Micro-Structured Fiber Optic Sensors. Fibers. 2017; 5(1):3. https://doi.org/10.3390/fib5010003 (Year: 2017).*

\* cited by examiner

*Primary Examiner* — Eric S. McCall
*Assistant Examiner* — Timothy P Graves
(74) *Attorney, Agent, or Firm* — Aaron R. Keith; Timothy L. Harney; Michael J. Dobbs

(57) ABSTRACT

Materials, methods of making, and methods of sensing liquid droplets with high spatial resolution as a signature of the on-set of corrosion using a hierarchical sensor network A hierarchical sensor network for sensing liquid droplets with high spatial resolution as a signature of the on-set of corrosion, including an interrogation system; and an intermediate sensor array layer in communication with the interrogation system. The network includes an interrogation system and an intermediate sensor array layer in communication with the interrogation system.

34 Claims, 12 Drawing Sheets

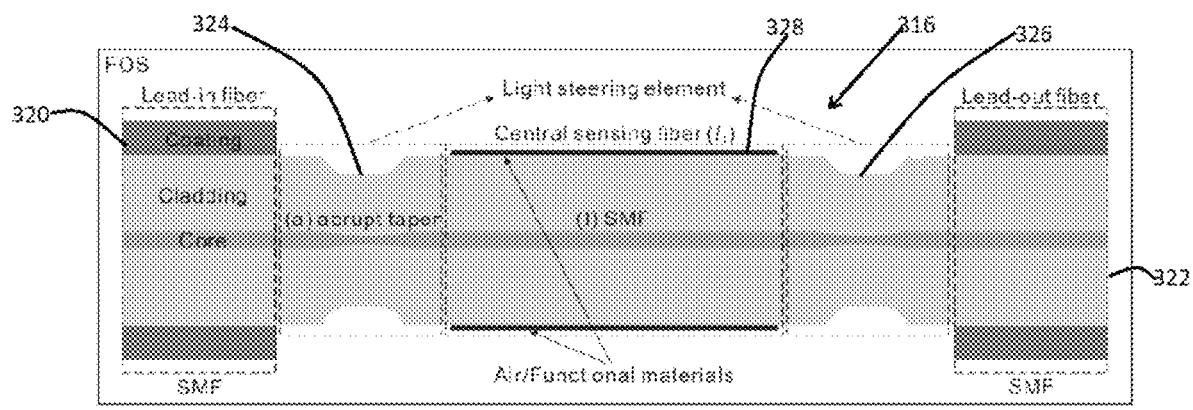
Fig. 3A
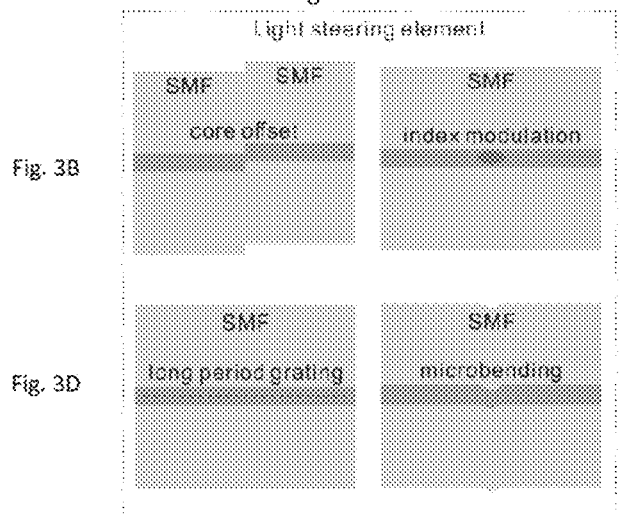
Fig. 3B
Fig. 3C
Fig. 3D
Fig. 3E

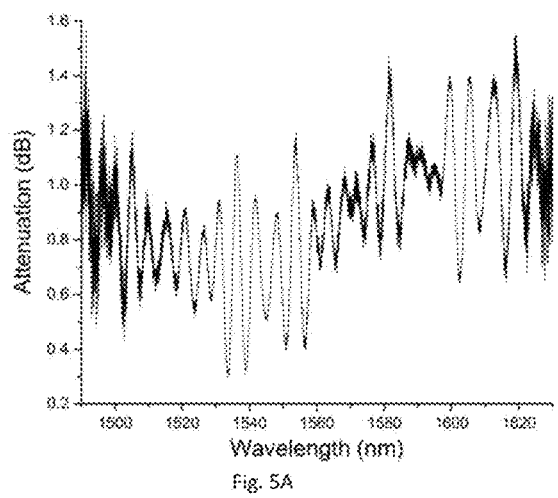
Fig. 5A
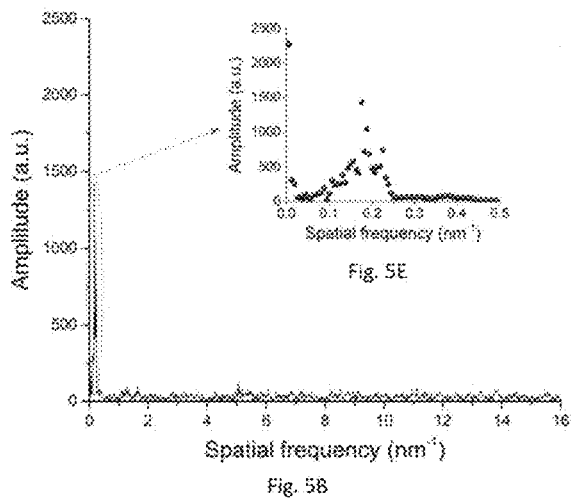
Fig. 5B
Fig. 5E
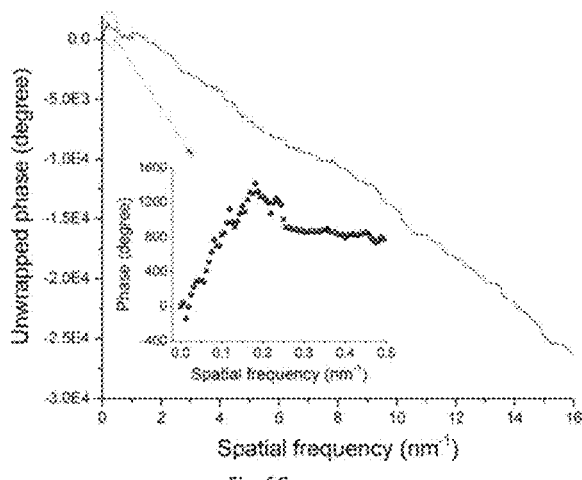
Fig. 5C
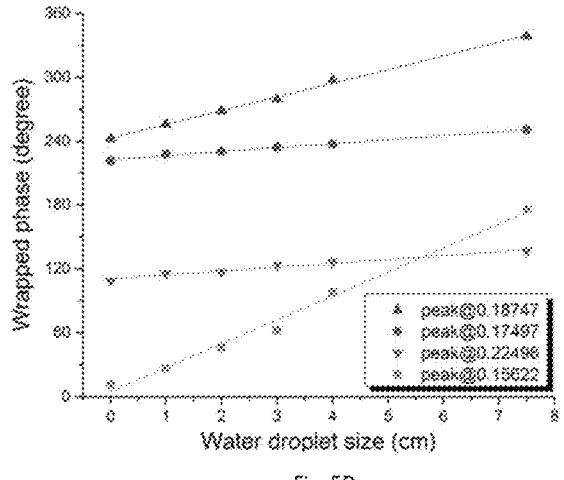
Fig. 5D

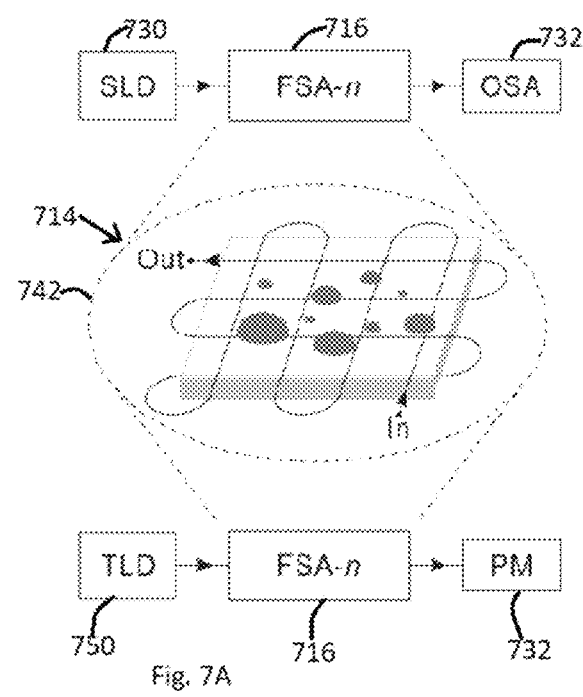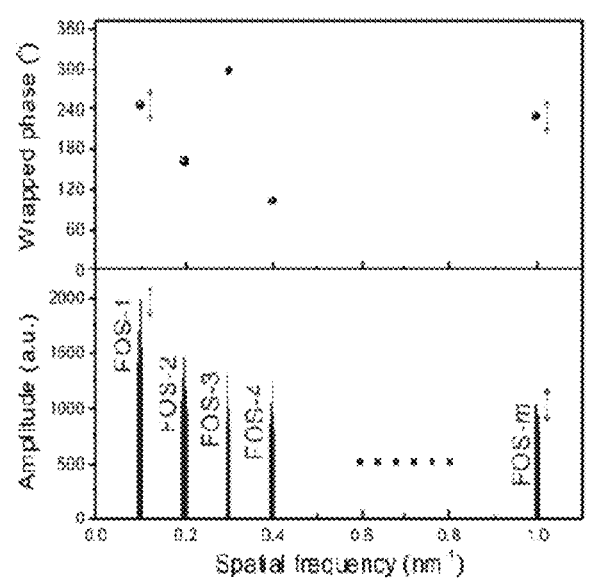
Fig. 7A
Fig. 7B

DISTRIBUTED FIBER-OPTIC SENSOR NETWORK FOR SENSING THE CORROSION ONSET AND QUANTIFICATION

CROSS-REFERENCE TO RELATED APPLICATIONS

This application claims the benefit of and priority to U.S. Provisional Application 62/567,223 titled DISTRIBUTED FIBER-OPTIC SENSOR NETWORK FOR SENSING THE CORROSION ONSET AND QUANTIFICATION filed Oct. 2, 2017, which is incorporated herein by reference in its entirety.

This application is related to U.S. patent application Ser. No. 15/395,018 titled CORROSION PROXY MATERIAL INTEGRATED SENSOR DEVICES FOR DISTRIBUTED SENSING OF EARLY CORROSION ONSET AND CORROSION QUANTIFICATION which is incorporated herein by reference in its entirety.

STATEMENT OF GOVERNMENT SUPPORT

The United States Government has rights in this invention pursuant to the employer-employee relationship of the Government to the inventors as U.S. Department of Energy employees and site-support contractors at the National Energy Technology Laboratory.

FIELD OF THE INVENTION

One or more embodiments consistent with the present disclosure relate to performing optical platform detection (water droplet condensation detection for example) or wireless platform detection.

BACKGROUND

The disclosure provides a system and method for optical platform detection or detection using a wireless platform.

Natural gas occupies nearly 30% of the energy consumption in the United States in 2016 according to Energy Information Administration. There are more than 528,000 km of natural gas transmission and gathering lines, and significant maintenance costs for pipeline operation is associated with corrosion control and integrity management. According to Pipeline and Hazardous Materials Safety Administration database, corrosion accounted for ~25% of the natural gas transmission and gathering pipeline incidents over the last 30 years, 61% of which was caused by internal corrosion. The corrosion-related annual cost is $6-$10 billion in the transmission pipeline industry in the United States. Therefore, it is important to monitor corrosion inside the gas pipelines to implement corrosion mitigation and control before any failure.

Top-of-the-Line corrosion (TLC) is a phenomenon encountered in natural gas transmission pipelines when internal corrosion occurs due to water vapor condensation and the presence of dissolved corrosive substances. When corrosion inhibitors are injected into a pipe operated in a stratified gas-liquid pipe flow, the inhibitor remain at the bottom of the line and do not provide mitigation at the top of the line. Despite an upstream gas dehydration treatment, liquid water can still form through the condensation of water vapor in the gas phase on the internal pipe walls due to the heat exchange occurring between the pipe and colder environments. In addition, glycol used in the gas dehydration units is introduced to the pipelines as a water/glycol mixture through mist carryover. Thus the condensed liquid may become enriched by various corrosive species present in the gas stream and assumes a low pH from dissolved acid gases such as inherently existing $CO_2$ and $H_2S$ as it is unbuffered. The pH rises as TLC occurs because the saline droplets become saturated and supersaturated with corrosion products. Corrosion sensing plays an important role in the activities of large infrastructure health monitoring in industry sectors.

Optical fibers have shown great potential as a sensing platform for in-situ corrosion monitoring and early detection, providing an effective way to assess the structural health of the natural gas pipelines and enhance the safe operation of natural gas pipelines. A fiber-optic sensor network for internal corrosion monitoring in gas pipelines is proposed. A multifunctional fiber-optic sensor (FOS) can realize precise localized multi-parameter measurements of condensed water properties. A fiber-optic sensor array (FSA) can consist of a sequence of FOS concatenated in a two-dimensional configuration and reflects the state of the environment in which it is physically placed in a local area to assist in prediction of the corrosion rate and evaluation of the corrosion level. The FOS interfaces with a distributed sensor interrogation (DSI) system with high spatial resolution and large measurement range through the FSA module, achieving a spatially resolved evaluation of the tendency of corrosion.

One or more embodiments consistent with the present disclosure relate to performing optical platform detection (water droplet condensation detection for example) using an optical fiber platform.

Wireless sensors such as surface acoustic wave sensor devices have also shown great potential for infrastructure monitoring applications. Wireless sensors such as surface acoustic wave sensors provide low-cost, distributed point measurements and can be placed at an arbitrary number of locations to best acquire information about the system being monitored. A wireless sensor network (WSN) is comprised of a network of distributed wireless sensors coupled with a wireless interrogator system (WIS) that allows for telemetry and communication with the distributed sensors. Such a WSN coupled with a WIS allows for a spatially resolved evaluation of the tendency for corrosion.

One or more embodiments consistent with the present disclosure relate to performing wireless platform detection (water droplet condensation detection for example) using, for example, the SAW platform.

These and other objects, aspects, and advantages of the present disclosure will become better understood with reference to the accompanying description and claims.

SUMMARY

Embodiments of the invention relate to a novel optical fiber sensor or wireless sensor network developed to monitor the internal corrosion processes in the natural gas transmission pipelines. Water droplet detection and ionic strength monitoring have been experimentally demonstrated by using the proposed sensors. These sensor networks provide a multifunctional platform for monitoring several major processes involved in the top-of-line corrosion, including the water dropwise condensation, dissolution of ambient corrosive gases, and corrosion production formation on the steel surface, as well as changes in environmental parameters such as temperature and stress in steel pipes. Furthermore, a distributed sensor interrogation system combining several spatially resolved demodulation schemes is proposed to determine the location of corrosion events and produce distributed corrosion sensing information along the path of the optical fiber sensor. Similarly, a distribution of wireless sensors to form a wireless sensor network can allow for localization of information throughout the system. This novel sensor approach exhibits unparalleled advantages over existing corrosion and corrosion on-set detection approaches in high sensitivity, multi-parameter measurement, and remote and distributed sensing.

One or more embodiments relate to a hierarchical sensor network for sensing liquid droplets with high spatial resolution as a signature of on-set of corrosion. The network includes an interrogation system; and an intermediate sensor array layer in communication with the interrogation system.

Another embodiment relates to a hierarchical sensor network for sensing water droplets with high spatial resolution to assist in detecting a water droplet condensation rate and predicting a corrosion rate. The network includes an optical time-domain reflectometry (OTDR) interrogation system which produces Top-of-the-Line Corrosion (TLC) sensing information; a fiber-optic sensor array (FSA) in communication with the OTDR system; and a fiber-optic layer in communication with the FSA.

In at least one embodiment the interrogation system is optical in nature and the intermediate sensor array layer is a distributed optical fiber sensing scheme, where the interrogation system may include an optical time-domain reflectometry (OTDR) interrogation system which produces Top-of-the-Line Corrosion (TLC) sensing information. Further the OTDR may include at least a pulse source, a fiber-optic coupler (FOC) in communication with at least the pulsed source and a photodetector in communication with the FOC.

In another embodiment, the hierarchical sensor network further includes the intermediate sensor array layer comprises a fiber-optic sensor array (FSA), where the FSA comprises a sequence of FSAs. Each of the FSAs comprise a sequence of fiber-optic sensors (FOS) concatenated in a two-dimensional configuration, where the FOSs reflect a state of the environment in which it is physically placed to assist in liquid droplet condensation rate and predicting a corrosion rate. In one or more embodiments, the two-dimensional configuration is selected from the group comprising a ring configuration and a grid configuration. Further embodiments of each of the FOSs includes a central sensing fiber region having opposing first and second ends; two light steering elements, one light steering element in communication with the first end and another light steering element in communication with the second end; a lead-in fiber in communication with the one light steering element; and a lead-out fiber in communication with the another light steering element.

Further embodiments include the interrogation system is wireless in nature and the intermediate sensor array layer is a wireless sensor network scheme, where the intermediate sensor array layer is a wireless sensor network comprised of passive wireless sensor devices distributed throughout a system to be monitored. One or more embodiments may include passive wireless sensor devices are comprised of surface acoustic wave (SAW) devices.

In other embodiments, the wireless sensor network produces Top-of-the-Line Corrosion (TLC) sensing information.

In yet one other embodiment, the intermediate sensor array layer comprises a passive wireless sensor array. The wireless sensor array may include a distributed set of passive wireless sensor devices.

In other embodiments, the passive wireless sensor devices are comprised of surface acoustic wave (SAW) devices functionalized to provide information about the presence of condensed water, the relative humidity, and/or the chemistry of condensed water. The OTDR may include at least a pulse source, a fiber-optic coupler (FOC) in communication with at least the pulsed source and a photodetector in communication with the FOC. The fiber-optic sensor array (FSA) may include a sequence of FSAs.

The following patents and patent applications are incorporated herein by reference in their entirety:
1. US 2012/0210776 A1 to SO et al which teaches a condensation sensing device, electronic apparatus, and condensation sensing method that detects a water droplet to sense the condensation.
2. US 2009/0039296 A1 to Richard which teaches a sensor arrangement for detecting a liquid on a surface.
3. US 2016/0161432 A1 to Dumitru which teaches condensation sensor systems and methods.
4. US 2006/0202044 A1 to Ruttiger et al which teaches a condensation sensor.
5. U.S. Pat. No. 5,367,583A to Sirkis which teaches a fiber optic stress-corrosion sensor and system.
6. U.S. Pat. No. 6,144,026 to Udd et al which teaches fiber optic grating corrosion and chemical sensor.
7. U.S. Pat. No. 5,646,400A to Perez et al. which teaches corrosion detecting and monitoring methods and apparatuses.
8. US 2011/0210014 A1 to Garosshen which teaches a corrosion sensor system.
9. U.S. Pat. No. 5,627,749A to Waterman et al. which teaches a corrosion monitoring tool.

The following articles are incorporated herein by reference in their entirety:
1. G. H. Koch, M. P. H. Brongers, N. G. Thompson, Y. P. Virmani, and J. H. Payer, Corrosion costs and preventive strategies in the United States, (2002). [link: https://trid.trb.org/view.aspx?id=707332] This reference demonstrates the significance of corrosion, including in natural gas gathering and transmission pipelines, which serves as the background of the invention.
2. O. Moghissi, L. Norris, P. Dusek, B. Cookingham, and N. Sridhar, Internal corrosion direct assessment of gas transmission pipelines, NACE-02087 (2002). [link: https://www.onepetro.org/conference-paper/NACE-02087] This reference summarizes the current internal corrosion assessment methods, which justifies the novelty of the invention.
3. Z. Zhang, D. Hinkson, M. Singer, H. Wang, and S. Nesic, A mechanistic model of top-of-the-line corrosion, Corrosion 67, 1051-1062 (2007). [link: http://corrosionjournal.org/doi/abs/10.50006/1.3278321?code=nace-prem-site&journalCode=corr] This reference studies the corrosion mechanism of top of the line corrosion, which verifies the development of the invention.
4. M. Singer, Study and modeling of the localized nature of top of the line corrosion, NACE-2016-7664 (2016). [link: https://www.onepetro.org/conference-paper/NACE-201-7664]. This reference studies the corrosion mechanism of top of the line corrosion, which verifies the development of the invention.
5. Y. Gunaltun, U. Kaewpradap, M. Singer, S. Nesic, S. Punpruk, and M. Thammachart, Progress in the prediction of top of the line corrosion and challenges to predict Corrosion rates measured in gas pipelines, NACE-10093 (2010). [link: https://www.onepetro.org/conference-paper/NACE-10093] This reference reviews the current models in predicting corrosion rate inside the natural gas pipelines, which verifies the relation between water condensation rate and corrosion rate.
6. R. Nyborg, and A. Dugstad, Top of line corrosion and water condensation rates in wet gas pipelines, NACE-07555 (2007). [link: https://www.nace.orq/cstm/Store/Product.aspx?id=24120511-7010-dc11-b943-0017a4466950] This reference studies the corrosion rate inside the natural gas pipelines, which verifies the relation between water condensation rate and corrosion rate.
7. M. Benounis and N. Jaffrezic-Renault, Elaboration of an optical fiber corrosion sensor for aircraft applications, Sensors and Actuators B: Chemical 100, 1-8 (2004). [link:http://www.sciencedirect.com/science/article/pii/S0925400503009031] An optical fiber corrosion sensor is fabricated by thermal deposition of an aluminum film onto an optical fiber core within the sensing region in order to follow corrosion in aeronautic structures.
8. C. K. Y. Leung, K. T. Wan, and L. Chen, A novel optical fiber sensor for steel corrosion in concrete structures, Sensors 8, 1960-1976, (2008). [link: http://www.mdpi.com/1424-8220/8/3/1960] The reflected signal from an optical fiber tip-coated with an iron thin film using the ion sputtering technique is monitored for steel corrosion in concrete structures.
9. Y. Machijima, M. Azemoto, T. Tada and H. Mori, Corrosion detection by fiber optic AE sensor, Journal of Acoustic Emission 27, 233-240 (2009). [link: www.la-zoc.jp/technical/monograph/docs/02_plant_05.pdf] A fiber optic AE sensor is used to detect acoustic emission produced by corrosion.
10. Y. Wang and H. Huang, Optical fiber corrosion sensor based on laser light reflection, Smart Materials and Structures 20, 085003 (2011). [link: http://iopscience.iop.org/article/10.1088/0964-1726/20/8/085003/pdf] An optical fiber corrosion sensor consists of an optical fiber reflection sensor and a tube/film subassembly formed by welding a sacrificial metallic film to a steel tube. The sensor multiplexing scheme is implemented by using an optical fiber coupler and a custom-made connector.
11. K. T. Wan and C. K. Y. Leung, Durability tests of a fiber optic corrosion sensor, Sensors 12, 3656-3668 (2012). [link: http://www.mdpi.com/1424-8220/12/3/3656/htm] Thin iron film is deposited on the end surface of a cleaved optical fiber by sputtering, and multiplexing several sensors by optical time domain reflectometer (OTDR) is adopted. The field trial, accelerated life test and freeze-thaw cycling test of the fiber optic based corrosion sensor is presented.
12. M. R. A. Hassan, M. H. A. Bakar, K. Dambul and F. R. M. Adikan, Optical-based sensors for monitoring corrosion of reinforcement rebar via an etched cladding Bragg grating, Sensors 12, 15820-15826 (2012). [link: http://www.mdpi.com/1424-8220/12/11/15820/htm] An 80% etched-cladding fiber Bragg grating sensor is used to monitor the corrosion of reinforcement rebar.
13. Y. Huang, Z. Gao, G. Chen, and H. Xiao, Long period fiber grating sensors coated with nano iron/silica particles for corrosion monitoring, Smart Materials and Structures 22, 075018 (2013). [link: http://iopscience.iop.org/article/10.1088/0964-1726/22/7/075018] A novel long period fiber grating (LPFG) sensor coated with a thin film of nano iron and silica particles is proposed, designed, and tested for corrosion and environmental monitoring.
14. C. McCague, M. Fabian, M. Karimi, M. Bravo, L. R. Jaroszewicz, P. Mergo, T. Sun, and K. T. V. Grattan, Novel sensor design using photonic crystal fibers for monitoring the onset of corrosion in reinforced concrete structures, Journal of Lightwave Technology 32, 891-896 (2014). [link: http://ieeexplore.ieee.org/document/6676809/] The corrosion sensor design uses birefringent photonic crystal fiber. The sensing technique exploits fully both the birefringence of the fibers for force/pressure measurement and their very low temperature sensitivity to detect the onset of corrosion.
15. Y. Huang, F. Tang, X. Liang, G. Chen, H. Xiao, and F. Azarmi, Steel bar corrosion monitoring with long-period fiber grating sensors coated with nano iron/silica particles and polyurethane, Structural Health Monitoring 14, 178-189 (2015). [link: http://journals.sagepub.com/doi/abs/10.1177/1475921714560070?journalCode=shma] A long-period fiber grating sensor coated with a thin layer of polyurethane and nano iron/silica particles is further developed and applied to monitor the corrosion process of deformed steel bars.
16. W. Li, C. Xu, S. C. M. Ho, B. Wang, and G. Song, Monitoring concrete deterioration due to reinforcement corrosion by integrating acoustic emission and FBG strain measurements, Sensors 17, 657 (2017). [link: http://iwww.mdpi.com/1424-8220/17/3/657] Corrosion monitoring of a steel reinforced mortar block is realized through combined acoustic emission and fiber Bragg grating strain measurement.
17. F. Deng, Y. Huang, F. Azarmi, and Y. Wang, Pitted corrosion detection of thermal sprayed metallic coatings using fiber Bragg grating sensors, Coatings 7, 35 (2017). [link: http://www.mdpi.com/2079-6412/7/3/35] An inline detection system for corrosion and crack detection is developed using fiber Bragg grating sensors. Quantitatively detecting corrosion rate of the coating, corrosion propagations, and cracks initialized in the metallic coating in real time is investigated.

BRIEF DESCRIPTION OF THE DRAWINGS

These and other features, aspects, and advantages of the multiple embodiments of the present invention will become better understood with reference to the following description, appended claims, and accompanied drawings where:

FIGS. 3A-3G depict schematic representations of the FOS where FIG. 3A depicts an abrupt taper; FIG. 3B depicts a core offset; FIG. 3C depicts an index modulation; FIG. 3D depicts a long period grating; and FIG. 3E depicts microbending; FIG. 3F depicts a thin-core fiber central sensor fiber; while FIG. 3G depicts a no-core; fiber central sensor fiber;

FIGS. 5A-5E depicts attenuation spectrums of the FOS where FIG. 5A depicts spatial frequency spectra of the FOS, FIG. 5B depicts an intensity spectrum, FIG. 5C depicts a phase spectrum, FIG. 5D depicts phase as a function of water droplet size for different cladding modes, FIG. 5E (insert) depicts phase as a function of water droplet size for different cladding modes;

FIG. 6A depicts a spatial mapping pattern of FOSs, FIG. 6B depicts a ring configuration, and FIG. 6C depicts a grid configuration;

FIGS. 7A-7B depict a setup for water drop measurement and scheme, where FIG. 7A illustrates of a setup for measuring water droplet analysis with the FSA and FIG. 7B illustrates sensing mechanism with the phase and intensity demodulation scheme;

DETAILED DESCRIPTION

The following description is provided to enable any person skilled in the art to use the invention and sets forth the best mode contemplated by the inventor for carrying out the invention. Various modifications, however, will remain readily apparent to those skilled in the art.

The invention is based on the relation between water condensation and corrosion rate. Corrosion is essentially an electrochemical process of metal oxidation, which requires an electrolyte to occur. Liquid water ($H_2O$) is the most common electrolyte for corrosion, acting as the ion carrier and sometimes the reactant for cathodic reaction. With dissolved salts and the acid gas, the aqueous electrolyte can become very corrosive with increased conductivity and lower pH. Without liquid water, the oxidation of metal usually needs a strong oxidant and high temperature (>100° C.). Since the water droplets provide the oasis for corrosion, the detection of water droplets can locate the spots for potential internal corrosion inside the pipelines. Corrosion rate (CR) of TLC has been found to be proportional to the water condensation rate ($R_{wc}$), and thus the measurement of $R_{wc}$ can predict and quantify the corrosion rate.

Figure 1:
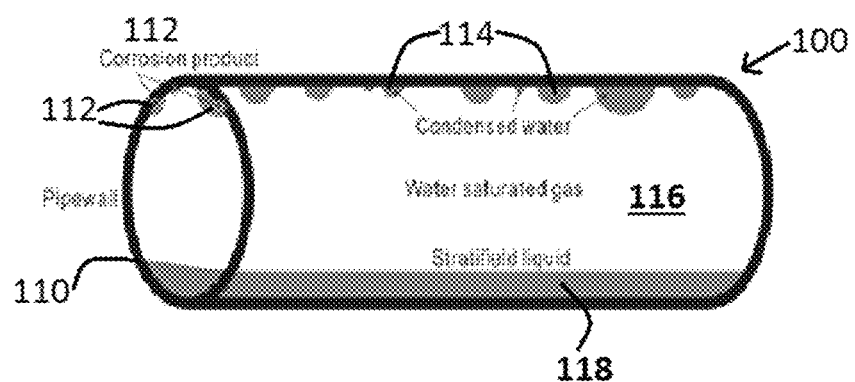
FIG. 1 illustrates an example of water droplets in a pipeline.

Top-of-the-Line-Corrosion (TLC) is a phenomenon encountered in the natural gas transmission pipelines 100 having a pipe wall 110 when internal corrosion occurs due to the condensation of water 114 and the dissolved corrosive substance 112 as illustrated in FIG. 1. Despite upstream gas dehydration treatment, liquid water can form through the condensation of water vapor 114 and the water carried over from plant upsets 116. In addition, glycol used in the gas dehydration units is miscible with water and may be introduced into the pipelines as a water/glycol mixture 118 through mist carryover or inadvertent upsets. Because the corrosion inhibitors cannot be effectively applied to the top of the line, the water droplets 114 on the top of the line are unbuffered with consequently low pH from dissolved acid gas such as inherently existing $CO_2$ and $H_2S$. As corrosion occurs, the water droplets are saturated and supersaturated with corrosion products 112, and the pH is increased. In the offshore pipe-in-pipe system, the "cold spots" are also prone to the corrosion due to condensed water where the gap is not fully filled up with insulation layer between the inner and outer pipes.

Figure 2:
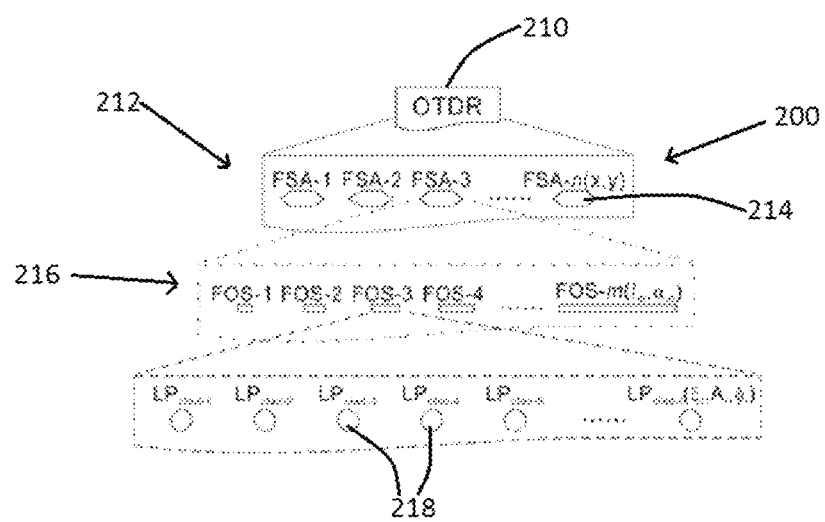
FIG. 2 depicts one representation of a multiplexed fiber-optic network for TLC sensing.
Figure 3F:
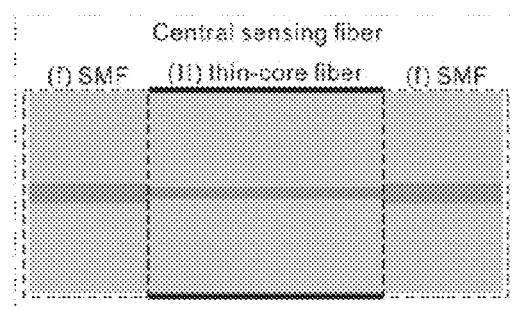
Figure 3G:
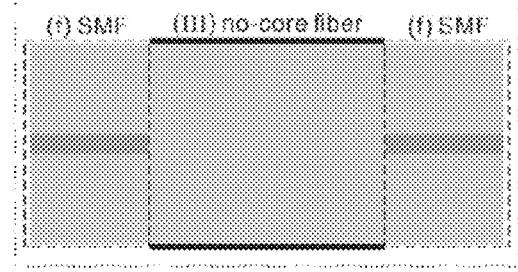

One or more embodiments relate to a three-level hierarchical sensor network 200 as illustrated in FIG. 2. As illustrated, low-level fiber-optic sensors (FOS) 206 realize precise localized multi-parameter measurements of condensing water droplet properties with high spatial resolution, and interface with a top-level optical time-domain reflectometry (OTDR) interrogation system 210, through an intermediate fiber-optic sensor array (FSA) level 212 Each individual FSA 214 consists of a sequence of FOSs 216 concatenated in a two-dimensional configuration and reflects the state of the environment in which it is physically placed in a local area to assist in the evaluation of the water condensation rate and prediction of the corrosion rate. In the illustrated embodiment, each FOS 216 consists of a sequence of linearly polarized (LP) 218. The OTDR interrogator 210 produces TLC sensing information concerning larger regions covered by the low- and intermediate-level sensors geographically distributed in the multiplexed optical fiber sensor network.

FIGS. 3A-3G illustrate a schematic of the FOS 316 which consists of lead-in and lead-out fibers 320, 322, two light steering elements 324, 326, and a central sensing fiber region 328. In one embodiment, the lead-in/lead-out fibers 320, 322 are standard telecommunication single-mode optical fiber (SMF) with 9/125 micron core/cladding dimension supporting the fundamental mode $LP_{core}$. When the central sensing fiber region is (I) SMF, the light steering elements 324, 326 can adopt a device structure of an abrupt taper (see FIG. 3A); core offset (see FIG. 3B); index modulation (see FIG. 3C); long period grating (see FIG. 3D); and microbending (see FIG. 3E).

The first light steering element induces mode excitation from the $LP_{core}$ to high-order cladding modes $LP_{clad-i}$ while the second light steering element re-couples $LP_{clad-i}$ back to the $LP_{core}$ through the central sensing fiber region to form the in-line fiber interferometer. When the central sensing fiber region is (II) thin-core fiber or (III) no-core fiber instead of (I) SMF as shown in the right inset of FIG. 3, the light steering elements should be (f) SMF. The central sensing fiber region can have either air as cladding with a bare fiber surface after stripping or re-coated functional materials of low refractive index as cladding. The length of the central sensing fiber is $l_1$ which is the distance between the two light steering elements. The coating layer of the lead-in/-out fiber of each FOS should remain in order to completely attenuate the residual cladding light, and the selection of the coating layer length depends on the mode coupling ratio of the light steering elements.

Figure 4:
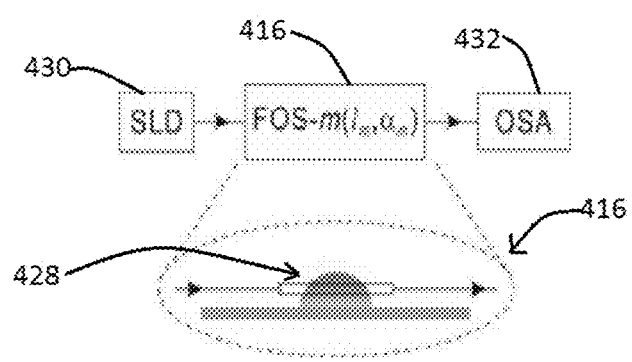
FIG. 4 illustrates a representation of the measurement setup for the water droplet analysis with the FOS-m.

The measurement setup for the water droplet analysis by using a single FOS 416 is illustrated in FIG. 4. A transmission spectrum of the $m^{th}$ fiber-optic sensor, FOS-m($l_m,\alpha_m$), with a central sensing fiber 428 length $l_m$ and an insertion loss $\alpha_m$ is obtained by using a superluminescent diode (SLD) 430 and an optical spectrum analyzer (OSA) 432. One sample FOS 416 is fabricated by making two identical abrupt tapers of a 60 μm waist diameter and a 700 μm taper length with a separation of 10 cm.

The attenuation spectrum in FIG. 5A is calculated by subtracting two transmission spectra of the FOS surrounded by air and immersed in the water droplet, where interference fringes are observed due to a superposition of multimode interference.

A Fourier transform of the wavelength spectrum in FIG. 5A provides a spatial frequency spectrum as shown in FIGS. 5B, 5C. FIG. 5B shows an intensity spectrum in the spatial frequency domain which exhibits multiple intensity peaks $A_i$ corresponding to different orders of cladding modes with different phase differences. The spatial frequency $\xi$ can be expressed as $\xi_i \approx \Delta n_{clad-i} L/\lambda_0$, where $\Delta n_{clad-i}$ is the effective index difference between the fundamental mode and i-th order cladding modes, and $\lambda_0$ is the center peak wavelength around which the first-order Taylor series is expanded. FIG. 5C shows an unwrapped phase spectrum in the spatial frequency domain, where the phase difference $\Delta \Phi_i$ between the fundamental mode and i-th order cladding modes is given by $\Delta \Phi_i = 2\pi \Delta n_{clad-i} L/\lambda$. The phase shift at one specific spatial frequency induced by any external perturbation can be expressed as $\delta \Phi_i = -2\pi \xi i (\pm \delta n_{clad-i} l \Delta n_{clad-i}) \Box 0$, where $\delta n_{clad-i}$ is the change in the effective index difference, ±indicates a choice of various environmental parameters of temperature (+) or external refractive index (−), for instance. FIGS. 5D,5E (insert) shows the water droplet size dependence on wrapped phases of cladding modes corresponding to four spatial frequency intensity peaks. It is noted that each cladding mode has distinctive sensitivity to different external disturbances due to its unique effective refractive index and optical field pattern. Thus each FOS module has great potential to realize simultaneous multi-parameter measurement with high sensitivity by extracting corresponding phase information of multiple cladding modes $LP_{clad-i}$. This is particular important for the composition analysis of the water droplets with dissolved corrosive gases or corrosion products. A character matrix $M_m$ may be defined to represent the sensing performance of the FOS-m based on phase shift calibration data by:

TABLE 1

$$M_m = \begin{bmatrix} C_1^T & C_1^{H_2S} & C_1^{pH} & \ldots & C_1^{D_{water}} \\ C_2^T & C_2^{H_2S} & C_2^{pH} & \ldots & C_2^{D_{water}} \\ C_3^T & C_3^{H_2S} & C_3^{pH} & \ldots & C_3^{D_{water}} \\ \ldots & \ldots & \ldots & \ldots & \ldots \\ C_i^T & C_i^{H_2S} & C_i^{pH} & \ldots & C_i^{D_{water}} \end{bmatrix}$$

$$\begin{bmatrix} \Delta T \\ \Delta H_2 S \\ \Delta pH \\ \ldots \\ \Delta D_{water} \end{bmatrix} = M_m^{-1} \begin{bmatrix} \delta\Phi_1 \\ \delta\Phi_2 \\ \delta\Phi_3 \\ \ldots \\ \delta\Phi_i \end{bmatrix}$$

where $M^{-1}$ is the inverse of the character matrix, $C_i^X$ represents the phase-related sensing coefficients for the i-th order cladding modes, X can be temperature (T), ionic strength, water droplet size ($D_{water}$) or many other environmental parameters.

Figure 6A:
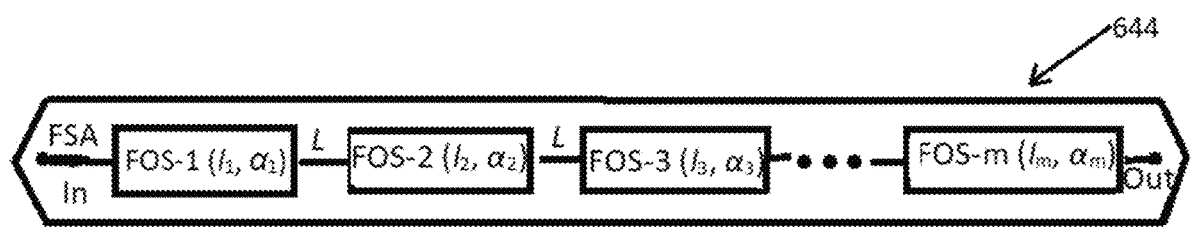
FIGS. 6A-6C depict configurations of the FSAs where
Figure 6B:
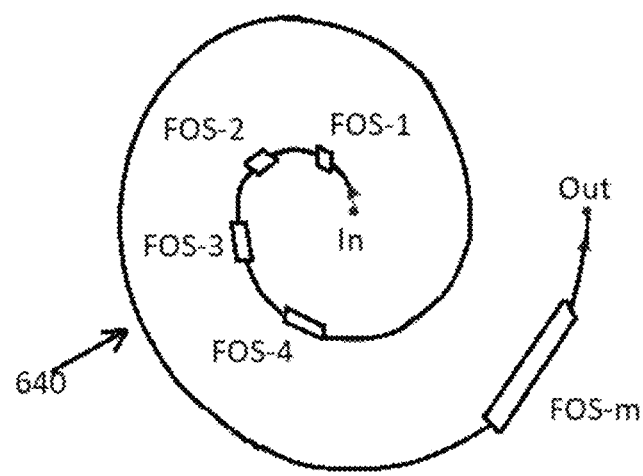
Figure 6C:
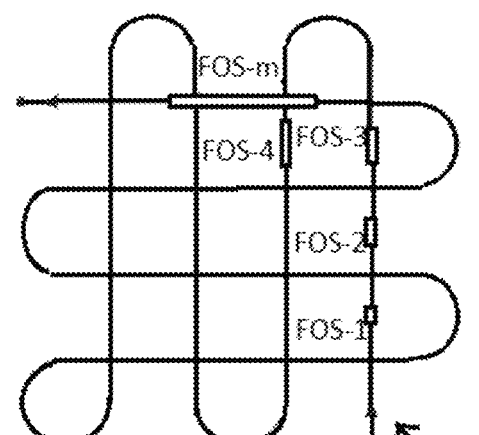

Combining multiple FOSs into a fiber-optic sensor array (FSA) would be beneficial to the overall evaluation of target state in two-dimension at large spatial scales, especially to determining the complex environmental conditions of a pipeline internal wall. A general design consideration is the optical power loss budget that determines the maximum value for m. Another design criteria is to ensure no signal interference between multiple FOS as they are concatenated. Firstly, the separation L between two neighboring FOSs which is defined as the sum of the lead-out fiber length of the front FOS and the lead-in fiber length of the rear FOS as shown in FIGS. 3A-3E, should remove the cladding light and only retain the core light. Secondly, the central sensing fiber length l of the FOSs should not be the same to distinguish different spatial frequency intensity peaks, avoiding major peak overlap. Typical values for m, $l_1$, $l_m$, and L are 10, 5 cm, 50 cm, and 1 cm, respectively. A ring configuration 640 shown in FIG. 6A or grid configuration FIG. 6B of the spatial mapping pattern as shown in FIG. 6C may be adopted based on the requirements of measurement area coverage and locations of access points to the site.

Once the size and location of the water droplets found on the surface of the FSA module 714 is obtained as illustrated in FIG. 7A, the $R_{wc}$ can be correlated with the demodulated light phase signal and CR can be correspondingly predicted. In addition, the FSA can essentially measure both static and dynamic signal changes like pipewall surface deformation, partial pressure of $CO_2$ and $H_2S$, and gas velocity, however the phase demodulation scheme may be problematic because the phase shift will become completely insensitive or random to the relatively large condition changes in the external medium. To address these problems, an alternate means is proposed involving the monitoring of intensity changes $\Delta A_i$ in the spatial frequency domain associated with the different cladding mode frequency components. FIG. 7B shows an illustration of sensing mechanism with the phase and intensity demodulation scheme by using the top measurement setup in FIG. 7A. The grid configuration 742 includes SLD 730, FSA 716, OSA 732, tunable laser diode (TLD) 750, FSA 716 and power meter (PM) 752. The intensity demodulation scheme provides a means by which absolute, rather than relative measurement can be made, respectively circumventing both the $2\pi$ phase range limitation and the insensitivity/random problem. It can be realized by Fourier transforming the averaged wavelength spectrum or using zero-padding during the Fourier transform process, because the total power in the cladding modes will be ultimately integrated for the purpose of the power measurement. Thus the measurement setup can be further simplified and replaced by a tunable laser diode 750 and a power meter 752 which detects the general intensity changes of the FSA 716, provided that only certain large impact events such as pipeline cracks are interested.

Figure 8:
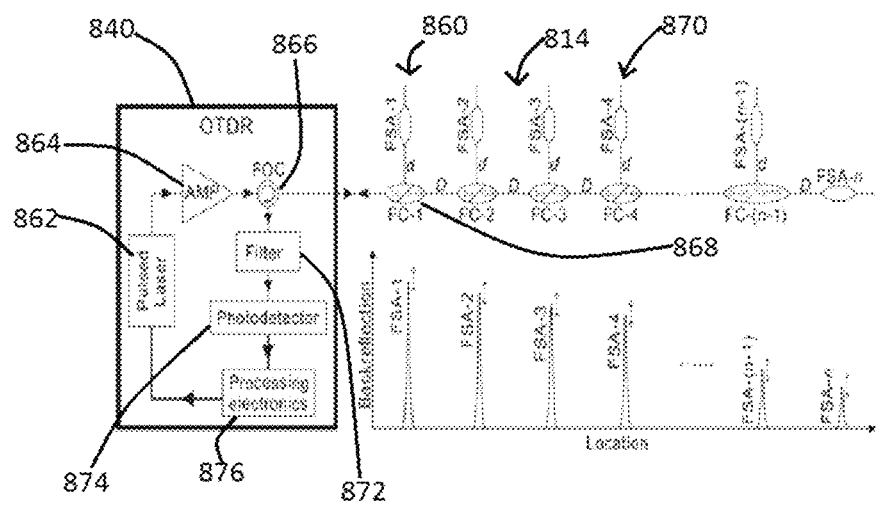
FIG. 8 depicts a configuration of the OTDR optical fiber sensor network.

Corrosion sensing plays an important role in the activities of large infrastructure health monitoring in industry sectors. Although the FSA 814 is a multi-point and self-referenced sensor module which can predict the corrosion rates in a local area, a distributed, long distance and large spatial scale measurement instrument is still highly desired to meet practical applications. As shown in FIG. 8, the proposed sensor network 860 consists of a number of FSAs 814 connected to a commercial or customized OTDR interrogation system 840 by standard telecommunication SMF and single-mode fiber couplers (FC). In the OTDR 840, the pulsed source 862 is amplified by amplifier 864 and launched down to the low- and intermediate-level sensors via a fiber-optic circulator (FOC) 866. The FC 868 splits the input optical signal such that a small fraction is directed to a FSA unit 870 and a large fraction is launched to the next FC and FSA unit. As corrosion phenomenon occurs, the backreflected output signal passes through an optical filter 872, a photodiode 874, and finally reaching the data acquisition and processing electronics unit 876 in OTDR will change correspondingly. A typical dead-zone of the OTDR system is about 1 m, and the distance D between any two FSA modules should be larger than this value. The maximum reach of the top-level OTDR interrogation system is limited by the insertion losses of the FOSs, FCs and fiber losses, as well as the coupling ratio of the FC corresponding to different FASs. The proposed fiber-optic sensor network can balance well between the spatial resolution and sensitivity by adopting various demodulation mechanisms.

Figure 9:
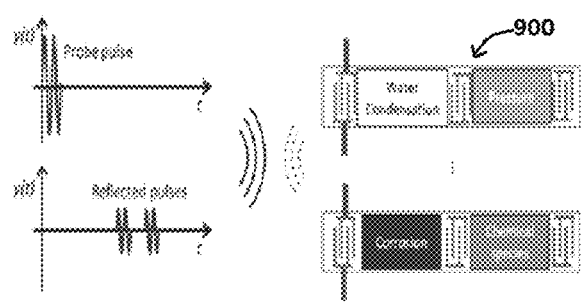
FIG. 9 depicts a wireless sensor network (WSN)

In one or more embodiments, a wireless sensor network 900 (WSN) consists of an array of passive wireless sensor devices such as surface acoustic wave (SAW) sensors, telemetry components, and a wireless interrogator as shown in FIG. 9. In some embodiments, the passive sensors in the array may be functionalized to detect and monitor multi-parameters including initial water condensation and condensed water chemistry. These sensors in the array can be powered and read in real time by a wireless interrogator through telemetry components such as antennas. In principle, these sensors can be either resonators or delay lines fabricated by photolithography on a piezoelectric substrate by patterning metal electrodes. For pipeline application, the later configuration is often preferred as it allows for powering and reading individual sensor elements in an array using single interrogator at a frequency for monitoring the parameters of interest.

Figure 10:
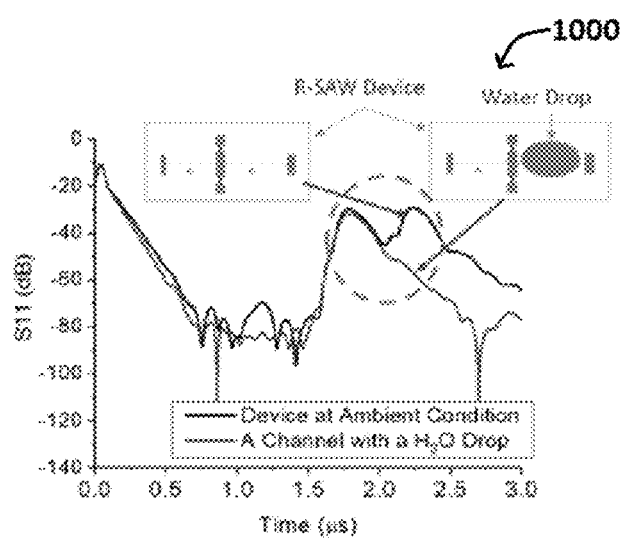
FIG. 10 depicts the response of an R-Saw device.

SAW devices may be based on a range of surface wave modes including Rayleigh (R-) and Shear Horizontal (SH-) SAWs. The devices based on the former mode provide an initial information of water drop condensation in localized environment through large attenuation of the reflected RF signal. Although these devices can be functionalized, water drop condensation may be possible even for as-fabricated devices due to the sensitivity of the propagating surface acoustic waves to the condensation of water on the SAW device surface. As an example, FIG. 10 illustrated the response of an R-SAW device 1000 fabricated on a Y-Z $LiNbO_3$.

The quantitative information on the presence of water condensation can also be obtained in real time using SAW devices, such as SH-SAW configurations, functionalized with sensing materials such as porous silica, polymers, metal-organic framework layers, and others. An adsorption of water by the sensing layers and the condensation of water on the surface can impact the mass on the surface of the device as well the dielectric and electrical properties of the medium on the surface. This effect causes an increase in the acoustic velocity which can be recorded by the interrogator in terms of time delay or phase change. The recorded change can eventually be correlated with the presence of condensed water as well as the chemistry of condensed water depending upon the functional sensing layer and/or the device design. Because of the ability to functionalize such devices with a broad range of sensing layers and to incorporate multiple sensing elements on a single device, other parameters may also be monitored simultaneously including temperature, pressure, and even early detection of corrosion on-set through integration with corrosion proxy materials.

Having described the basic concept of the embodiments, it will be apparent to those skilled in the art that the foregoing detailed disclosure is intended to be presented by way of example.

Accordingly, these terms should be interpreted as indicating that insubstantial or inconsequential modifications or alterations and various improvements of the subject matter described and claimed are considered to be within the scope of the spirited embodiments as recited in the appended claims.

Additionally, the recited order of the elements or sequences, or the use of numbers, letters or other designations therefor, is not intended to limit the claimed processes to any order except as may be specified. All ranges disclosed herein also encompass any and all possible sub-ranges and combinations of sub-ranges thereof. Any listed range is easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art, all language such as up to, at least, greater than, less than, and the like refer to ranges which are subsequently broken down into sub-ranges as discussed above. As utilized herein, the terms "about," "substantially," and other similar terms are intended to have a broad meaning in conjunction with the common and accepted usage by those having ordinary skill in the art to which the subject matter of this disclosure pertains. As utilized herein, the term "approximately equal to" shall carry the meaning of being within 15, 10, 5, 4, 3, 2, or 1 percent of the subject measurement, item, unit, or concentration, with preference given to the percent variance. It should be understood by those of skill in the art who review this disclosure that these terms are intended to allow a description of certain features described and claimed without restricting the scope of these features to the exact numerical ranges provided. Accordingly, the embodiments are limited only by the following claims and equivalents thereto. All publications and patent documents cited in this application are incorporated by reference in their entirety for all purposes to the same extent as if each individual publication or patent document were so individually denoted.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

We claim:

1. A hierarchical sensor network for sensing liquid droplets with high spatial resolution as a signature of on-set of corrosion, comprising:
    an interrogation system; and
    an intermediate fiber-optic sensor array (FSA) layer in communication with the interrogation system, wherein the FSA comprises a sequence of fiber-optic sensors (FOS), wherein each of the FOSs comprises:
        a central sensing fiber region having opposing first and second ends, wherein the central sensing fiber region comprises functionalized fiber coated with water sensitive materials, where the water sensitive coating is selected from the group comprising polymer, hydrogel, metal-organic framework layers, and other materials, said water sensitive coating changes certain properties due to water contact and triggers an optical response;
        two light steering elements, one light steering element in communication with the first end and another light steering element in communication with the second end;
        a lead-in fiber in communication with the one light steering element; and
        a lead-out fiber in communication with the another light steering element.

2. The hierarchical sensor network of claim 1 wherein the interrogation system is optical in nature and the intermediate sensor array layer is a distributed optical fiber sensing scheme.

3. The hierarchical sensor network of claim 1 wherein the interrogation system comprises an optical time-domain reflectometry (OTDR) interrogation system which produces Top-of-the-Line Corrosion (TLC) sensing information.

4. The hierarchical sensor network of claim 3 wherein the OTDR comprises at least a pulse source, a fiber-optic coupler (FOC) in communication with at least the pulsed source and a photodetector in communication with the FOC.

5. The hierarchical sensor network of claim 1 wherein the FSA comprises a sequence of FSAs.

6. The hierarchical sensor network of claim 5 wherein each of the FSAs comprise a sequence of fiber-optic sensors (FOS) concatenated in a two-dimensional configuration, where the FOSs reflect a state of the environment in which it is physically placed to assist in liquid droplet condensation rate and predicting a corrosion rate.

7. The hierarchical sensor network of claim 6 wherein the two-dimensional configuration is selected from the group comprising a ring configuration and a grid configuration.

8. The hierarchical sensor network of claim 1 wherein the lead-in and lead-out fibers comprise single-mode optical fiber (SMF).

9. The hierarchical sensor network of claim 1 wherein the central sensing fiber region is selected from the group comprising an SMF, a thin-core fiber and a no-core fiber.

10. The hierarchical sensor network of claim 9 wherein, when the central sensing fiber region is an SMF, the two light steering elements may adopt a device structure selected from the group comprising an abrupt taper, a core offset, an index modulation, a long period grating and microbending.

11. The hierarchical sensor network of claim 9 wherein, when the central sensing fiber region is a thin-core fiber or a no-core fiber, the two light steering elements are SMFs.

12. The hierarchical sensor network of claim 1 wherein the interrogation system is wireless in nature and the intermediate sensor array layer is a wireless sensor network scheme.

13. The hierarchical sensor network of claim 12 wherein the intermediate sensor array layer is a wireless sensor network comprised of passive wireless sensor devices distributed throughout a system to be monitored.

14. The hierarchical sensor network of claim 13 wherein the passive wireless sensor devices are comprised of surface acoustic wave (SAW) devices.

15. The hierarchical sensor network of claim 14 wherein the passive wireless sensor devices are comprised of surface acoustic wave (SAW) devices functionalized to provide information about the presence of condensed water, the relative humidity, and/or the chemistry of condensed water.

16. The hierarchical sensor network of claim 1 wherein the interrogation system comprises an RF interrogator system for the wireless sensor network which produces Top-of-the-Line Corrosion (TLC) sensing information.

17. The hierarchical sensor network of claim 1 wherein the intermediate sensor array layer comprises a passive wireless sensor array.

18. The hierarchical sensor network of claim 17 wherein the wireless sensor array comprises a distributed set of passive wireless sensor devices.

19. The hierarchical sensor network of claim 1 wherein said hierarchical sensor network is configured to detect one or more properties of condensed water in contact with the FOS based on optical changes to the central sensing fiber region due to contact with said condensed water.

20. The hierarchical sensor network of claim 19 wherein the properties of condensed water detected are selected from the group consisting of: the presence of condensed water, the chemistry of the condensed water, and combinations thereof.

21. A hierarchical sensor network for sensing water droplets with high spatial resolution to assist in detecting a water droplet condensation rate and predicting a corrosion rate, comprising:
   an optical time-domain reflectometry (OTDR) interrogation system which produces Top-of-the-Line Corrosion (TLC) sensing information;
   a fiber-optic sensor array (FSA) in communication with the OTDR system, wherein the FSA comprises a sequence of fiber-optic sensors (FOS), wherein each of the FOS comprises:
      a central sensing fiber region having opposing first and second ends, wherein the central sensing fiber region comprises functionalized fiber coated with water sensitive materials, where the water sensitive coating is selected from the group comprising polymer, hydrogel, metal-organic framework layers, and other materials, said water sensitive coating changes certain properties due to water contact and triggers an optical response;
      two light steering elements, one light steering element in communication with the first end and another light steering element in communication with the second end;
      a lead-in fiber in communication with the one light steering element; and
      a lead-out fiber in communication with the another light steering element; and
   a fiber-optic layer in communication with the FSA.

22. The hierarchical sensor network of claim 21 wherein the OTDR comprises at least a pulse source, a fiber-optic coupler (FOC) in communication with at least the pulsed source and a photodetector in communication with the FOC.

23. The hierarchical sensor network of claim 21 wherein the fiber-optic sensor array (FSA) comprises a sequence of FSAs.

24. The hierarchical sensor network of claim 23 wherein each of the FSAs comprise a sequence of fiber-optic sensors (FOS) concatenated in a two-dimensional configuration, where the FOSs reflect a state of the environment.

25. The hierarchical sensor network of claim 24 wherein the two-dimensional configuration is selected from the group comprising a ring configuration and a grid configuration.

26. The hierarchical sensor network of claim 21 wherein the lead-in and lead-out fibers comprise single-mode optical fiber (SMF).

27. The hierarchical sensor network of claim 21 wherein the central sensing fiber region is selected from the group comprising SMF, a thin-core fiber and a no-core fiber.

28. The hierarchical sensor network of claim 27 wherein, when the central sensing fiber region is an SMF, the two light steering elements may adopt a device structure selected from the group comprising an abrupt taper, a core offset, an index modulation, a long period grating and microbending.

29. The hierarchical sensor network of claim 27 wherein, when the central sensing fiber region is a thin-core fiber or a no-core fiber, the two light steering elements are SMFs.

30. The hierarchical sensor network of claim 21 wherein said hierarchical sensor network is configured to detect one or more properties of condensed water in contact with the FOS based on optical changes to the central sensing fiber region due to contact with said condensed water.

31. The hierarchical sensor network of claim 30 wherein the properties of condensed water detected are selected from the group consisting of: the presence of condensed water, the chemistry of the condensed water, and combinations thereof.

32. A method of sensing liquid droplets with high spatial resolution as a signature of the on-set of corrosion using a hierarchical sensor network comprising:
   detecting properties of condensed water using a hierarchical sensor network, wherein the hierarchical sensor network comprises:
      an interrogation system; and
      an intermediate fiber-optic sensor array (FSA) layer in communication with the interrogation system, wherein the FSA comprises a sequence of fiber-optic sensors (FOS), wherein each of the FOSs comprises:
         a central sensing fiber region having opposing first and second ends, wherein the central sensing fiber region comprises functionalized fiber coated with water sensitive materials, where the water sensitive coating is selected from the group comprising polymer, hydrogel, metal-organic framework layers, and other materials, said water sensitive coating changes certain properties due to water contact and triggers an optical response;

two light steering elements, one light steering element in communication with the first end and another light steering element in communication with the second end;

a lead-in fiber in communication with the one light steering element; and a lead-out fiber in communication with the another light steering element, wherein detecting properties of condensed water comprises measuring optical changes to the central sensing fiber region due to contact with said condensed water.

33. The method of claim 32 wherein the central sensing fiber region is selected from the group comprising SMF, a thin-core fiber and a no-core fiber, and wherein when the central sensing fiber region is an SMF, the two light steering elements may adopt a device structure selected from the group comprising an abrupt taper, a core offset, an index modulation, a long period grating and microbending.

34. The method of claim 32 wherein the properties of condensed water detected are selected from the group consisting of: the presence of condensed water, the chemistry of the condensed water, and combinations thereof.

* * * * *